March 23, 1926.
W. R. McGOWEN
FENDER GUARD
Filed Dec. 11, 1924
1,578,056
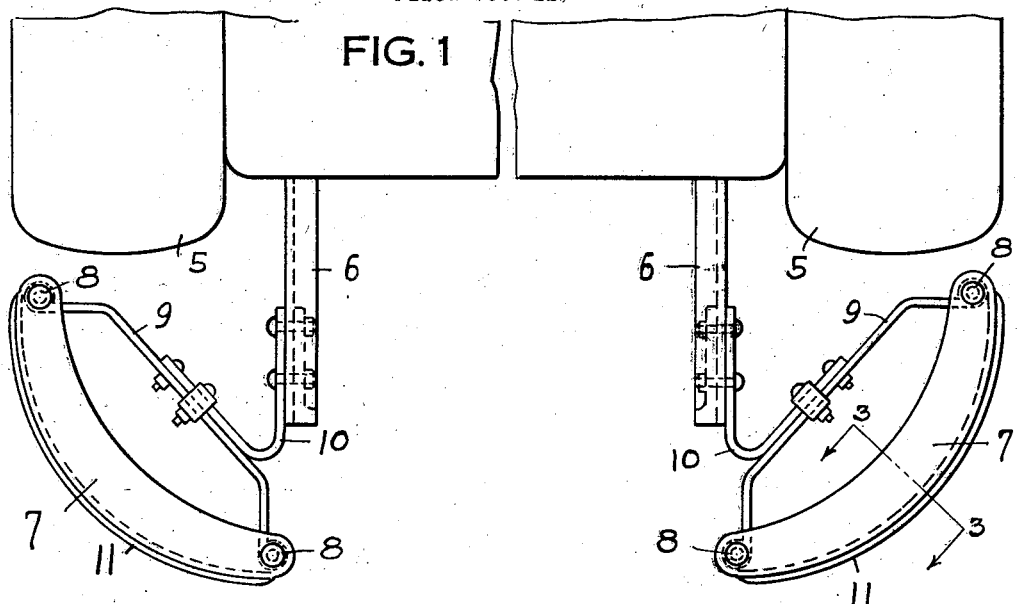
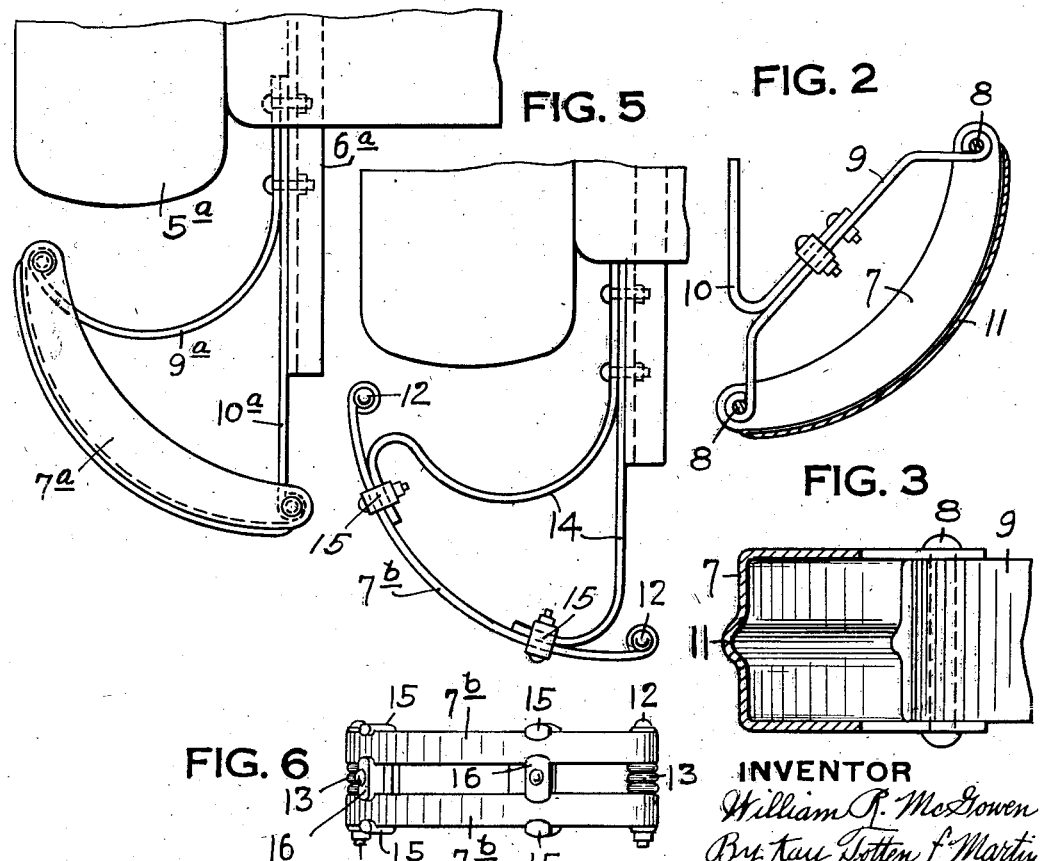
INVENTOR
William R. McGowen
By Kay, Totten & Martin,
Attorneys Patented Mar. 23, 1926.

1,578,056

UNITED STATES PATENT OFFICE.

WILLIAM R. McGOWEN, OF McKEES ROCKS, PENNSYLVANIA, ASSIGNOR TO UNITED STATES CHAIN & FORGING COMPANY, OF PITTSBURGH, PENNSYLVANIA, A CORPORATION OF DELAWARE.

FENDER GUARD.

Application filed December 11, 1924. Serial No. 755,252.

*To all whom it may concern:*

Be it known that I, WILLIAM R. McGOWEN, a citizen of the United States, and resident of McKees Rocks, in the county of Allegheny and State of Pennsylvania, have invented a new and useful Improvement in Fender Guards; and I do hereby declare the following to be a full, clear, and exact description thereof.

My invention relates to fender guards for automobiles and the like, and particularly to what are known in the trade as "bumperettes", or small bumpers especially adapted for mounting at the rear corners of an automobile.

One object of my invention is to provide a bumper or guard of simpler construction and of greater effectiveness than some of those heretofore employed.

Some of the forms which my invention may take are shown in the accompanying drawing, wherein Fig. 1 is a plan view of the rear portion of an automobile to which bumpers embodying my invention are applied; Fig. 2 is a sectional plan view of one of the bumpers of Fig. 1; Fig. 3 is a view taken on the line 3—3 of Fig. 1; Fig. 4 is a plan view of a portion of an automobile with a bumper of another form applied thereto, and Figs. 5 and 6 are plan and face views, respectively, of still another form of bumper embodying my invention.

Referring to Fig. 1, the members 5 are fenders for the rear wheels of an automobile and 6 are the side frames. These parts may all be of standard form. The bumper comprises a channel bar 7 disposed in a horizontal plane and provided with pivot pins 8 at its opposite ends. The ends of a strap member 9 of spring steel or the like, are bent around the pins 8 and have pivotal movement thereon when the intermediate portion of the strap is flexed, as under impact stresses through engagement of the bumper with an extraneous object.

The channel bar 7 and the strap 9 are secured to the frame 6 of the vehicle by a second strap member 10, preferably of spring steel or the like, which is bent to the form of an angle and has its opposite ends bolted or otherwise secured to the strap 9 and the vehicle frame, respectively. The channel bar 7 may be provided with a bead 11 longitudinally of its face.

It will be understood that the strap members 9 and 10 yieldably resist impacts to the bar 7, and that by reason of the pivotal connection between the ends of the member 9 and the bar 7, the strain to which the strap 9 is subjected under impacts is reduced.

Referring now to Fig. 4, I show a fender 5ª protected by a bumper composed of a channel member 7ª and straps 9ª and 10ª. These straps are pivotally connected at one end to the bar 7ª and at the other end are secured to the vehicle frame 6ª.

It will be understood that as both the members 9ª and 10ª extend from the bumper to the vehicle frame, impact stresses are divided between them, whereas each strap 9 and 10 of Fig. 1 has imposed thereon the entire thrust of an impact. The straps 9 and 10 of Fig. 1 may therefore be of heavier material than the straps 9ª and 10ª of Fig. 4, or if the two kinds of bumpers are made with the same weight of material, the bumper of Fig. 1 may be suitable for light vehicles and the bumper of Fig. 4 employed on heavier vehicles.

With reference to Figs. 5 and 6, I show a form of bumper similar in some respects to that of Fig. 4 but wherein a pair of yieldable buffer bars 7ᵇ have been substituted for the channel bar 7ª. The bars 7ᵇ are held in assembled relation by bolts 12 and spacer rings 13. The arms 14 are bolted to the vehicle frame at their inner ends and at their outer ends are secured to the bars 7ᵇ by means of clips 15 and clamping plates 16. While I have shown two bars 7ᵇ, only one of these bars need be employed, or more than two can be used if desired.

The bumpers are not limited to application at the rear corners of a vehicle, but may be applied to the front thereof or employed in other relations.

The form and arrangement of the bars 7 and their supports permit of the "cushioning" of impacts to serve to deflect objects coming into contact therewith, and to one side of the vehicle.

Various changes in detail and general arrangement may be made without departing from the spirit and scope of the invention as defined in the accompanying claims.

I claim as my invention:

1. An impact member comprising a channel bar of arcuate form, a flexible strap member having its opposite ends pivotally connected to the said bar adjacent to the ends thereof, and means for securing said strap member to a frame.

2. An impact structure comprising a bumper bar of arcuate form, a yieldable strap member having its opposite ends pivotally connected to the respective ends of said bar, and a second strap member bent to an acute angle and having its one end connected to an intermediate portion of the first-named strap member and its other end adapted for connection to a vehicle frame.

3. An impact member comprising a bumper bar of arcuate form, and means for securing said bar to one corner of a vehicle, comprising a strap having its ends connected to said bar adjacent to the end portions thereof, and a second strap member having one end connected to an intermediate portion of the first-named strap portion and its other end adapted for connection to a vehicle frame.

In testimony whereof I, the said WILLIAM R. McGOWEN, have hereunto set my hand.

WILLIAM R. McGOWEN.